(12) United States Patent
Uihlein et al.

(10) Patent No.: US 9,427,937 B2
(45) Date of Patent: Aug. 30, 2016

(54) ANTI-WEAR COATING

(75) Inventors: Thomas Uihlein, Dachau (DE);
Wolfgang Eichmann, Puchheim (DE);
Falko Heutling, Munich (DE);
Annegret Brendel, Weichs (DE)

(73) Assignee: MTU AERO ENGINES AG, Munich (DE)

( * ) Notice: Subject to any disclaimer, the term of this patent is extended or adjusted under 35 U.S.C. 154(b) by 546 days.

(21) Appl. No.: 13/880,904

(22) PCT Filed: Oct. 25, 2011

(86) PCT No.: PCT/EP2011/068678
§ 371 (c)(1),
(2), (4) Date: May 15, 2013

(87) PCT Pub. No.: WO2012/055881
PCT Pub. Date: May 3, 2012

(65) Prior Publication Data
US 2013/0280480 A1    Oct. 24, 2013

(30) Foreign Application Priority Data
Oct. 25, 2010   (DE) ........................ 10 2010 060 152

(51) Int. Cl.
| | |
|---|---|
| *B32B 7/00* | (2006.01) |
| *B32B 7/02* | (2006.01) |
| *C23C 28/04* | (2006.01) |
| *C23C 28/00* | (2006.01) |
| *F01D 5/28* | (2006.01) |

(52) U.S. Cl.
CPC ............... *B32B 7/02* (2013.01); *C23C 28/042* (2013.01); *C23C 28/044* (2013.01); *C23C 28/40* (2013.01); *F01D 5/288* (2013.01); *B32B 2250/42* (2013.01); *C04B 2237/04* (2013.01); *C04B 2237/086* (2013.01); *C04B 2237/363* (2013.01); *C04B 2237/597* (2013.01); *F05D 2230/313* (2013.01); *F05D 2300/611* (2013.01); *Y10T 428/24149* (2015.01)

(58) Field of Classification Search
None
See application file for complete search history.

(56) References Cited

U.S. PATENT DOCUMENTS

| | | | | |
|---|---|---|---|---|
| RE32,464 E | * | 7/1987 | Aine ....................... | G11B 5/725 428/672 |
| 4,724,169 A | * | 2/1988 | Keem ..................... | C23C 28/00 427/255.7 |
| 4,837,230 A | * | 6/1989 | Chen ...................... | B32B 18/00 423/345 |
| 4,992,318 A | * | 2/1991 | Gadkaree ................ | B32B 5/26 428/702 |
| 5,268,216 A | * | 12/1993 | Keem ................... | C10M 103/00 428/698 |
| 5,443,770 A | * | 8/1995 | Krstic ..................... | B32B 18/00 264/642 |

(Continued)

FOREIGN PATENT DOCUMENTS

| | | |
|---|---|---|
| DE | 10108344 A1 | 9/2001 |
| DE | 102004001392 A1 | 8/2004 |

(Continued)

*Primary Examiner* — David Sample
*Assistant Examiner* — Nicholas W Jordan
(74) *Attorney, Agent, or Firm* — Abel Law Group, LLP

(57) ABSTRACT

The invention relates to an anti-wear coating, specifically for components which are subject to erosion under mechanical loading, in particular for gas turbine components, said coating comprising at least two different individual layers which preferably alternate with one another multiply and are applied to a surface of a component which is to be coated. The individual layers comprise a ceramic main layer (45, 46, 47, 48) and a quasi-ductile, non-metallic intermediate layer (41, 42, 43, 44).

20 Claims, 6 Drawing Sheets

(56) References Cited

U.S. PATENT DOCUMENTS

| | | | |
|---|---|---|---|
| 6,284,366 B1* | 9/2001 | Konig | C23C 16/305 |
| | | | 428/698 |
| 6,821,624 B2 | 11/2004 | Utsumi et al. | |
| 6,858,333 B2* | 2/2005 | Henderer | C23C 30/005 |
| | | | 428/704 |
| 7,416,786 B2* | 8/2008 | Oda | C23C 14/024 |
| | | | 428/469 |
| 7,763,367 B2 | 7/2010 | Arndt et al. | |
| 7,927,709 B2 | 4/2011 | Eichmann et al. | |
| 8,012,562 B2 | 9/2011 | Eichmann et al. | |
| 8,231,958 B2 | 7/2012 | Hoover et al. | |
| 2001/0024737 A1* | 9/2001 | Utsumi | C23C 14/024 |
| | | | 428/655 |
| 2003/0138658 A1 | 7/2003 | Taylor et al. | |
| 2007/0190351 A1 | 8/2007 | Eichmann et al. | |
| 2008/0317998 A1 | 12/2008 | Eichmann et al. | |
| 2009/0005233 A1 | 1/2009 | Arndt et al. | |
| 2009/0092842 A1 | 4/2009 | Hoover et al. | |

FOREIGN PATENT DOCUMENTS

| | | |
|---|---|---|
| DE | 102006001864 A1 | 7/2007 |
| EP | 2011901 A1 | 1/2009 |
| EP | 2047979 A1 | 4/2009 |
| JP | 2010151267 A | 7/2010 |

* cited by examiner

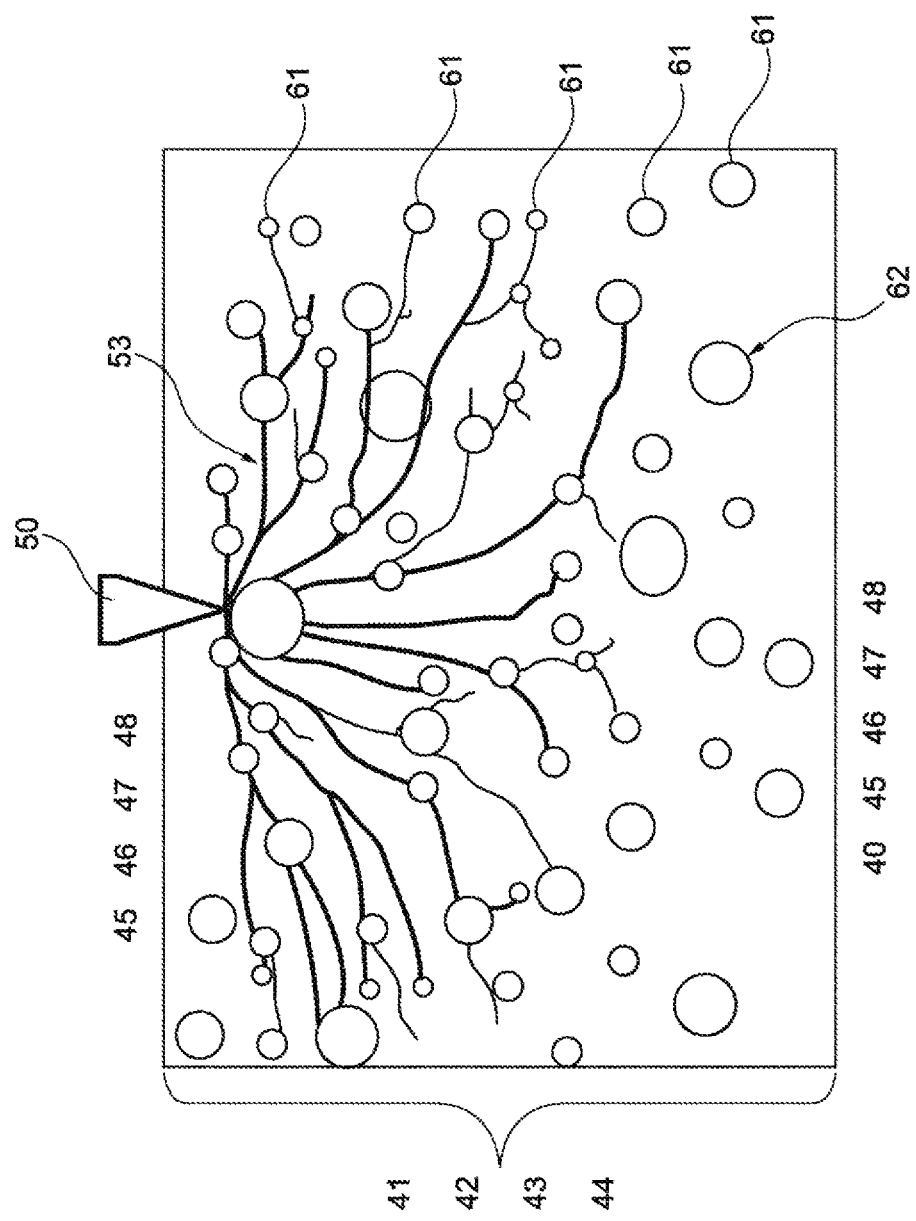

ANTI-WEAR COATING

BACKGROUND OF THE INVENTION

1. Field of the Invention

The invention relates to an antiwear coating especially for components which are subject to erosion under mechanical stress, in particular for gas turbine components, which consists of at least two different individual layers which have been applied in a multiply alternating manner with one another to a surface to be coated of a component.

2. Discussion of Background Information

Gas turbine components are provided with an antiwear layer for protection against wear, especially erosion and corrosion. This antiwear layer consists of a plurality of individual layers composed of different materials, as is known from the document DE 10 2004 001 392.6. Here, a metallic layer is firstly applied to a component in order to make good bonding of the antiwear layer to the metallic substrate material possible. This is followed by a metal alloy and a gradated metal-ceramic material. This multilayer system is concluded by a ceramic layer. This multilayer system can also be deposited a plurality of times on top of the first multilayer system, always commencing with a metallic layer to achieve better bonding to the metallic substrate material and ending with a ceramic layer on the surface. In addition, a bonding layer can be inserted between the first multilayer system and the component.

In general, such multilayer systems based on this principle are made up of hard (main) and soft (intermediate) layers. The main layers have a high erosion resistance and the intermediate layers have a high ductility. As a result, cracks which form in the case of overloading in the multilayer structure are stopped in the ductile intermediate layers by blunting of the crack tips.

To prevent erosion, structuring the hard ceramic layers of a multilayer system is known from the document DE 10 2006 001 864.8. Such ceramic layers are segmented in the vertical direction in a columnar manner in order to prevent detachment of relatively large regions of the layer during particle erosion attack. Here, the columnar segmentation is in the form of columns or stems or fibers. The interfaces between the columns of the layers segmented in a columnar fashion prevent the growth of microcracks in the direction parallel to the surface which can be caused during erosive stress. However, it is a disadvantage that cracks in the vertical direction can be propagated unhindered along the interfaces. When a component is stressed, these interfaces between columns act as micronotches or initial microcracks. In the case of severe overstressing, the ductile intermediate layers can no longer stop the arriving microcracks and the latter grow into the substrate material. The microcrack formed under tensile stress can propagate far into the substrate material and lead to premature failure of the component. This has the substantial disadvantage that the life of a component is considerably reduced.

It is therefore an object of the invention to provide an antiwear layer which firstly increases the life of a component and secondly prevents microcrack formation.

SUMMARY OF THE INVENTION

The object of the invention is achieved by an antiwear coating as set forth in the independent claim(s). Further advantageous embodiments of the invention are specified in the dependent claims.

The invention relates to an antiwear coating which is especially suitable for components which are subject to erosion under mechanical stress, in particular for gas turbine components, and comprises at least two different individual layers which have preferably been applied in an alternating manner (in the case of more than two layers) to a surface to be coated of a component. however, in contrast to the known antiwear layers, the individual layers in the antiwear coating of the invention are formed firstly by a known ceramic main layer and secondly by a pseudoductile, non-metallic intermediate layer. the pseudoductile, non-metallic intermediate layer is, as will be shown below, configured in such a way that energy is withdrawn from cracks which grow in the direction of the substrate material by crack branching in the pseudoductile, non-metallic intermediate layer, so that crack growth can be slowed or stopped.

A corresponding antiwear coating can likewise be configured as a multilayer coating, with the pseudoductile non-metallic intermediate layer and the ceramic main layer which has a brittle and hard property profile being able to be arranged alternately a number of times above one another.

In particular, the pseudoductile, non-metallic intermediate layer may be arranged directly on the component to be coated, while a hard, ceramic main layer may be arranged at the surface of the antiwear coating.

In an embodiment of the invention, the pseudoductile, non-metallic intermediate layer may comprise a material having weak bonds, preferably materials having a sheet structure or a hexagonal lattice structure which make easy shearing-off of the material possible or comprise easily activatable sliding planes, with the sheet planes or basal planes of the material or the easily activatable sliding planes being arranged parallel to the surface of the component. Thus, arsenic and antimony, for example, are suitable materials since they have a sheet structure, and also, for example, graphite, molybdenum disulfide and/or hexagonal boron nitride since they have a hexagonal lattice structure. The low adhesion between the basal planes or the easy sliding-off of adjacent planes in these materials results in crack deflection, so that the crack spreads out between the basal planes or the planes which can readily slide relative to one another. Since the materials are applied in such a way that the basal planes or the planes which can readily slide relative to one another are aligned parallel to the surface to be coated, crack growth in the direction of the substrate material is avoided.

In a further embodiment of the invention, the pseudoductile, non-metallic intermediate layer may have a multilayer system which has ceramic layers in addition to layers having relatively weak bonding (sliding layers). Materials combinations such as C/TiC, C/SiC, C/ZrC, hexagonal BN/cubic BN and/or hexagonal BN/SiC are suitable for this purpose.

In a further embodiment of the invention, the sublayers in the multilayer system of the pseudoductile, non-metallic intermediate layer may have weak interfaces with one another.

In a further embodiment of the invention, layers having relatively weak bonds (sliding layers) in the multilayer system may have no or minor chemical reactions with ceramic layers in the multilayer system.

In a further embodiment of the invention, layers having relatively weak bonding (sliding layers) and ceramic layers in the multilayer system may have a low surface roughness. This low surface roughness ensures weak mechanical intermeshing between the individual layers.

In a further embodiment of the invention, the pseudoductile, non-metallic intermediate layer may comprise a ceramic material and/or further hard material compounds having deliberately introduced pores. Here, the ceramic material may comprise chromium nitride, titanium nitride and/or compounds therefrom, in particular with further elements such as aluminum or silicon, so that, for example, chromium aluminum nitride or titanium aluminum nitride or chromium silicon nitride or titanium silicon nitride is present.

In a further embodiment of the invention, the pseudoductile, non-metallic intermediate layer may comprise a ceramic and/or hard material compounds having deliberately introduced microcracks which run parallel to the surface. The material may once again comprise chromium nitride, titanium nitride and/or compounds therefrom, in particular with further elements such as aluminum or silicon, and/or further known hard material compounds having a nitride or carbide basis.

In a further embodiment of the invention, the pseudoductile, non-metallic intermediate layer may comprise a ceramic material and/or a hard material compound having deliberately introduced foreign phases.

BRIEF DESCRIPTION OF THE DRAWINGS

The invention is illustrated below with the aid of an example and reference to the accompanying drawings. The drawings show, purely schematically, FIG. 1 crack branching in an intermediate layer according to the invention;

FIG. 6 a depiction of the intermediate layer according to the invention having deliberately introduced foreign phases.

DETAILED DESCRIPTION OF THE INVENTION

Figure 1:
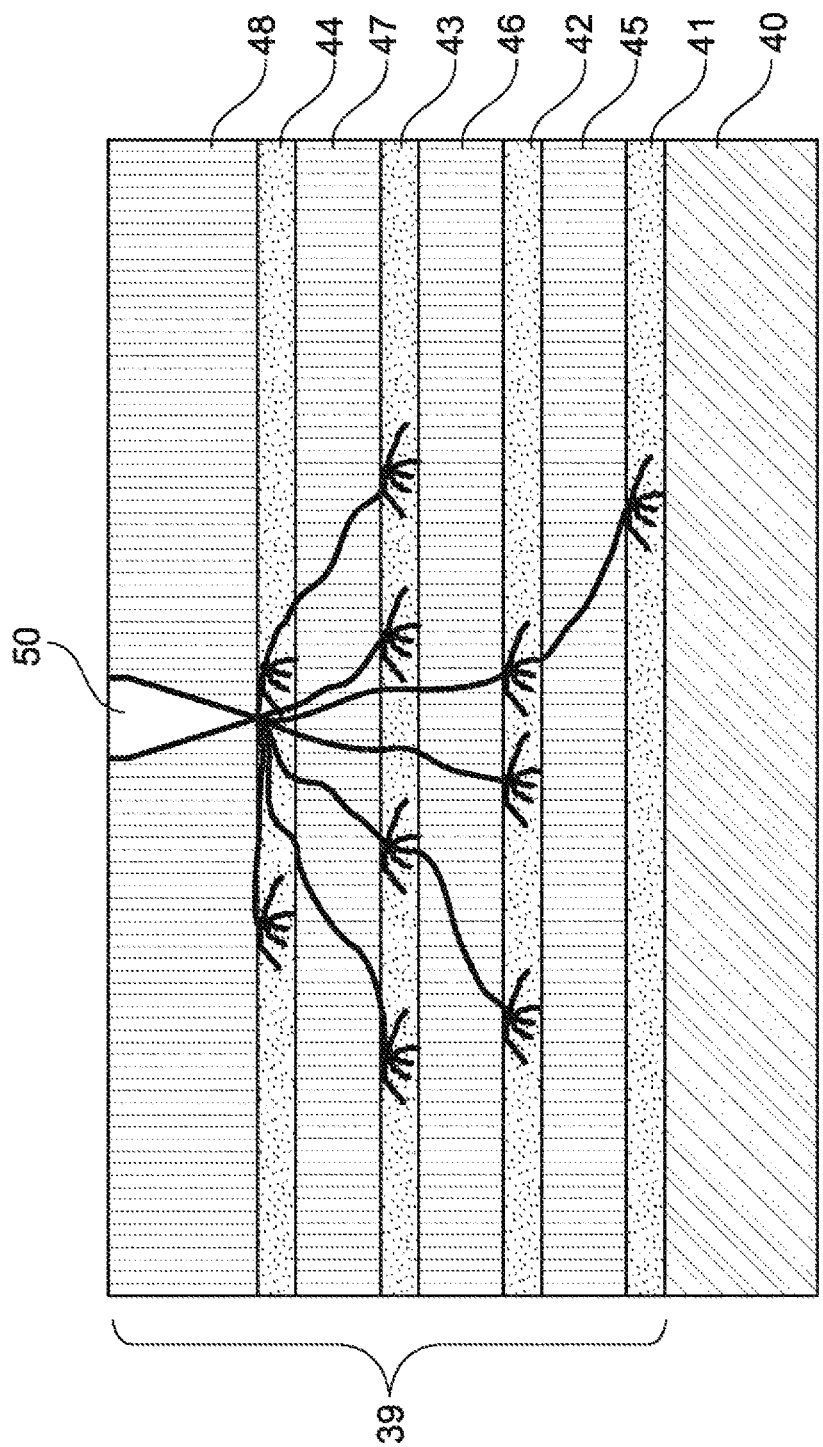

FIG. 1 shows a substrate material 40 and a multilayer system 39 applied thereto.

Influencing of the properties (e.g. mechanical strength) of the substrate material 40 by cracks which propagate under stress from the multilayer system 39 into the substrate material 40 can be prevented by a specific structure of the individual layers of the multilayer system 39. The multilayer system 39 has a first intermediate layer 41, a hard ceramic main layer 45, a second intermediate layer 42, a ceramic main layer 46, a third intermediate layer 43, a third ceramic main layer 47, a fourth intermediate layer 44 and a fourth ceramic main layer 48. The hard ceramic main layers make it possible for the crack to be propagated directly in the direction of the substrate material 40. The pseudoductile, non-metallic intermediate layers 41, 42, 43, 44 according to the invention in the multilayer system 39 prevent the crack 50 from growing further in the direction of the substrate material 40 and leading to premature damage to the component. Energy is withdrawn from the crack 50 by crack branching in the intermediate layers 41, 42, 43, 44 and the ceramic multilayer system 39 is thereby given pseudoductile behavior.

Figure 2:
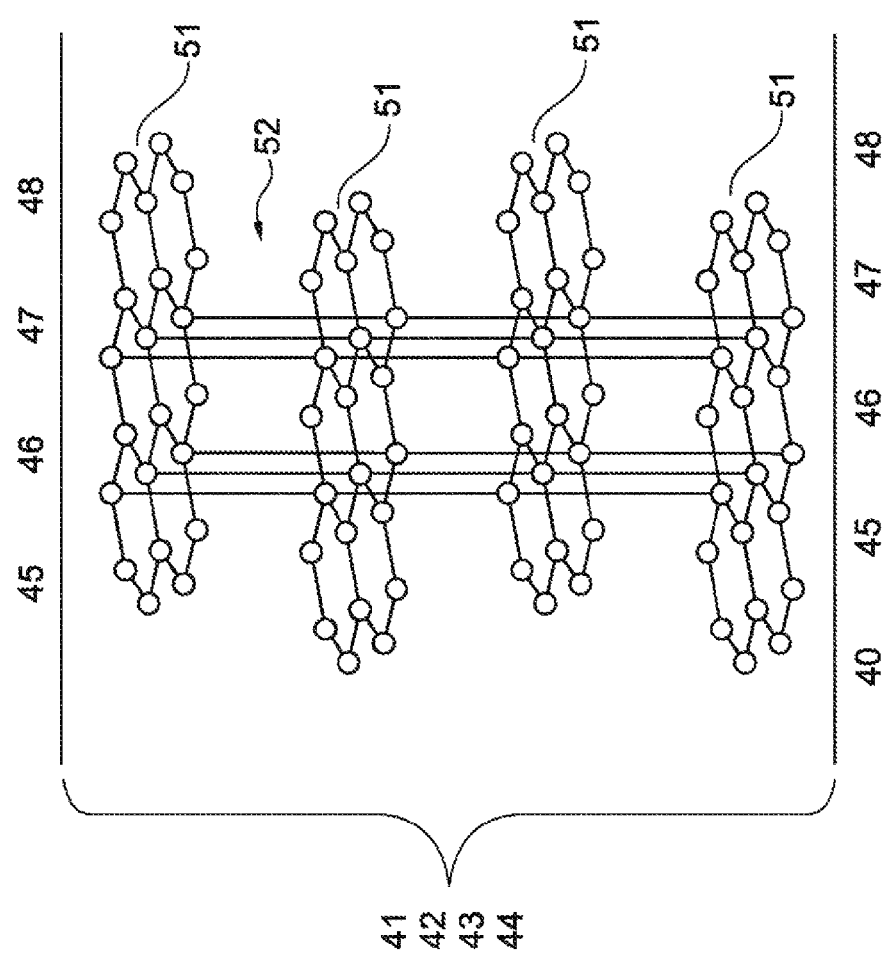
FIG. 2 a sheet structure or basal planes in the hexagonal lattice structure of graphite.

Materials having a sheet structure are suitable for the intermediate layers 41, 42, 43, 44. Such a sheet structure is displayed by arsenic and antimony. In addition, hexagonal modifications of carbon can also be used. Thus, a hexagonal lattice structure of graphite can be seen in FIG. 2. The strength in the planes of the sheets (basal planes 51) is, due to atom bonds, greater than perpendicular thereto. However, weak secondary valence forces 52 bring about low adhesion between the basal planes. The basal planes 51 should therefore be oriented parallel to the surfaces of the substrate material. Cracks which go out from the ceramic main layers 45, 46, 47, 48 in the multilayer system 39 will then grow preferentially along the weak bond 52 (between the basal planes 51) of the intermediate layer 41, 42, 43, 44 according to the invention. This enables crack deflection and splitting up into many smaller cracks to be achieved, which leads to stopping of the crack.

Figure 3:
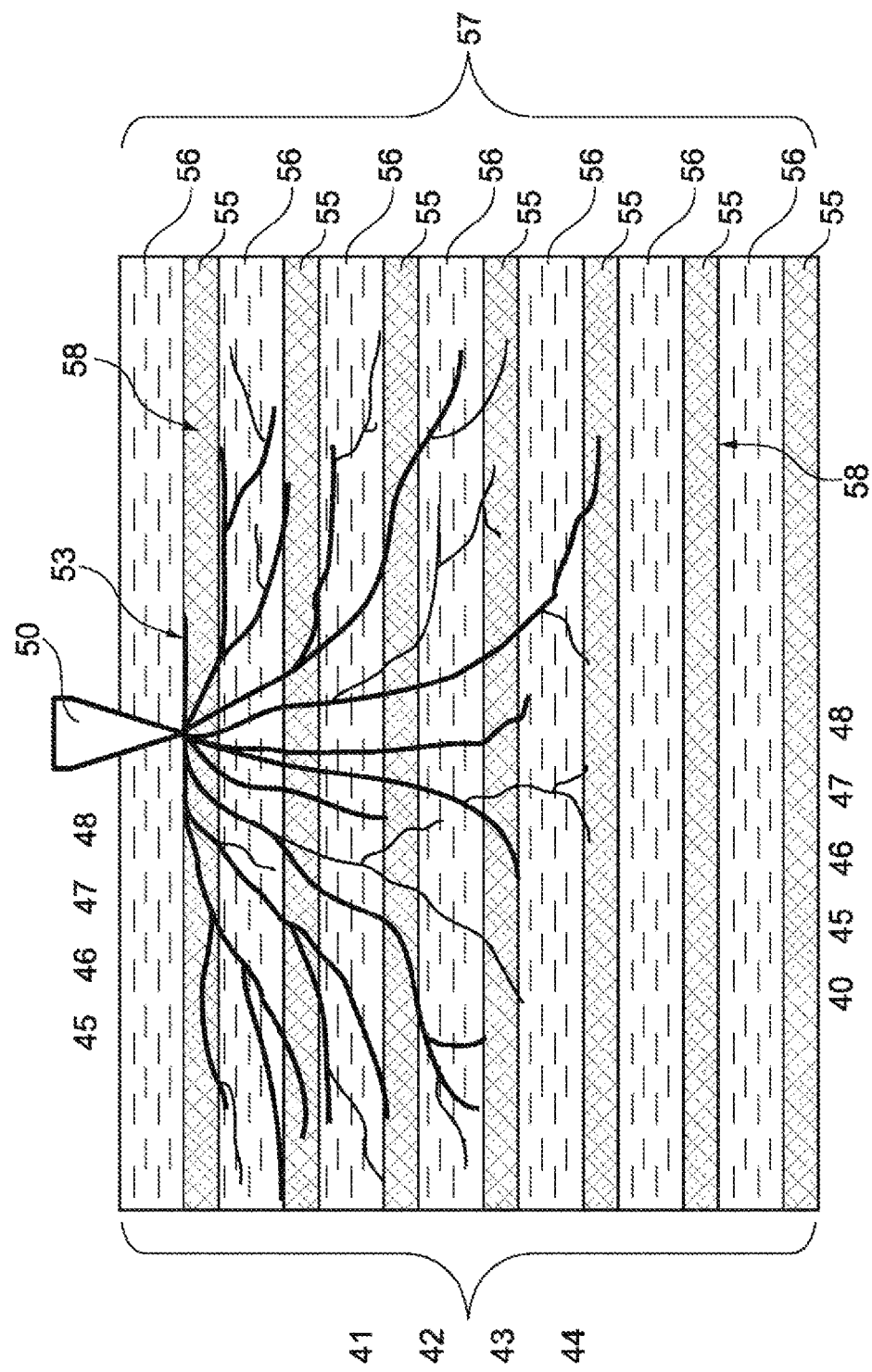
FIG. 3 a structure of the intermediate layer according to the invention as multilayer system.

FIG. 3 schematically shows an intermediate layer 41, 42, 43, 44 according to the invention as multilayer system 57. The structure of the multilayer 57 is selected so that either layers having relatively weak bonding 55 and/or weak interfaces 58 are present between the sublayers 55, 56 of the multilayer 57. The deflection of vertical cracks 50 which go out from the ceramic main layers 45, 46, 47, 48 occurs either at the weak interfaces 58 of the multilayer according to the invention or in sublayers 55 having weak bonds. Weak interfaces 58 can be produced by using suitable material pairs which do not undergo a chemical reaction. A low surface roughness of the individual layers ensures weak mechanical intermeshing and thus also low adhesion.

Figure 4:
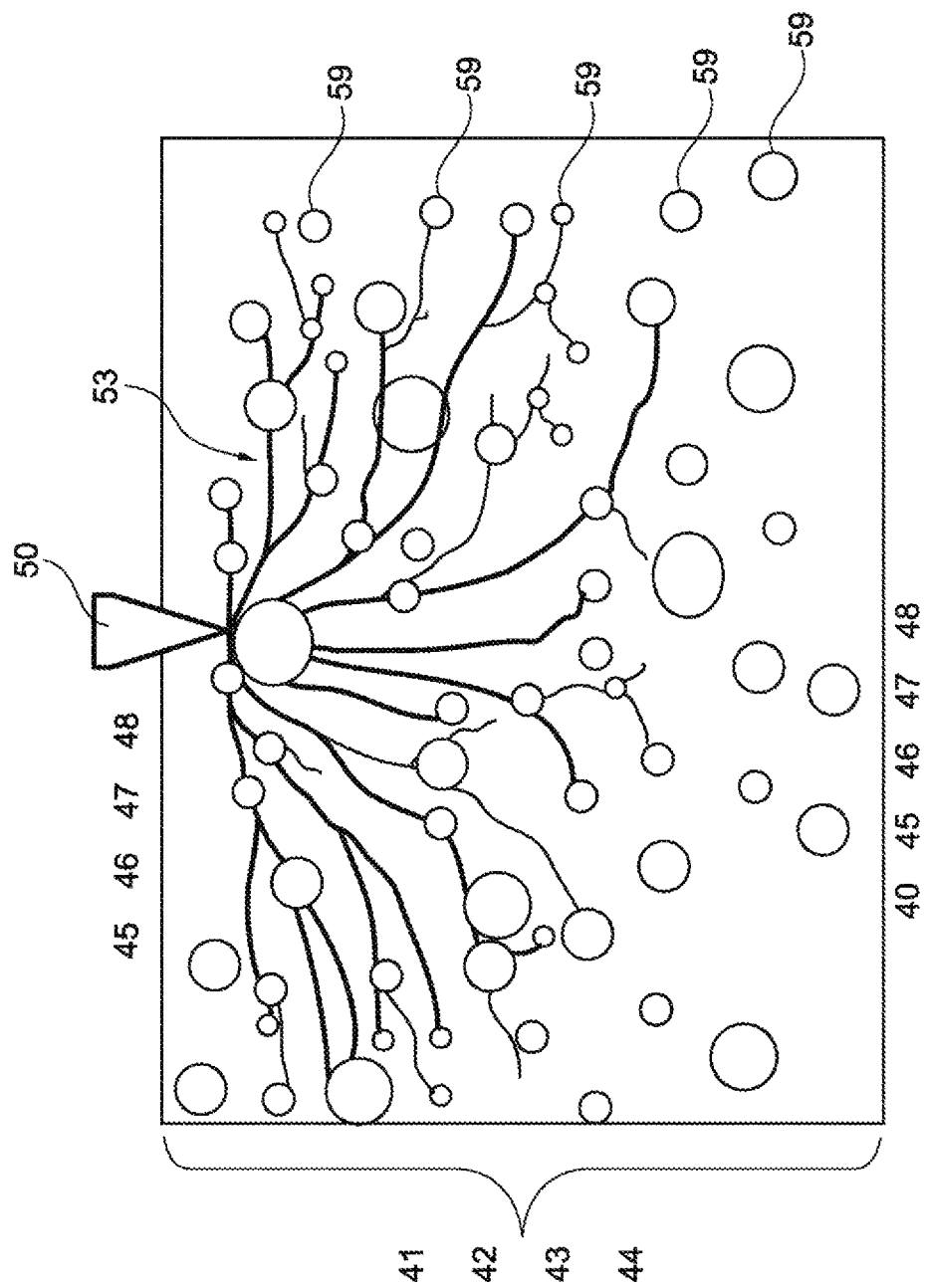
FIG. 4 a depiction of the intermediate layer according to the invention having pores which stop the cracks.

FIG. 4 schematically shows an embodiment of the intermediate layer 41, 42, 43, 44 according to the invention having pores 59. The deliberate introduction of pores 59 into the intermediate layer 41, 42, 43, 44 results in cracks which go out from the ceramic main layer 45, 46, 47, 48 of the multilayer system 39 altering the direction of propagation, branching and not growing through to the substrate material 40. The change in the direction of propagation is brought about by the pores which are joined to one another only via weak material bridges.

Figure 5:
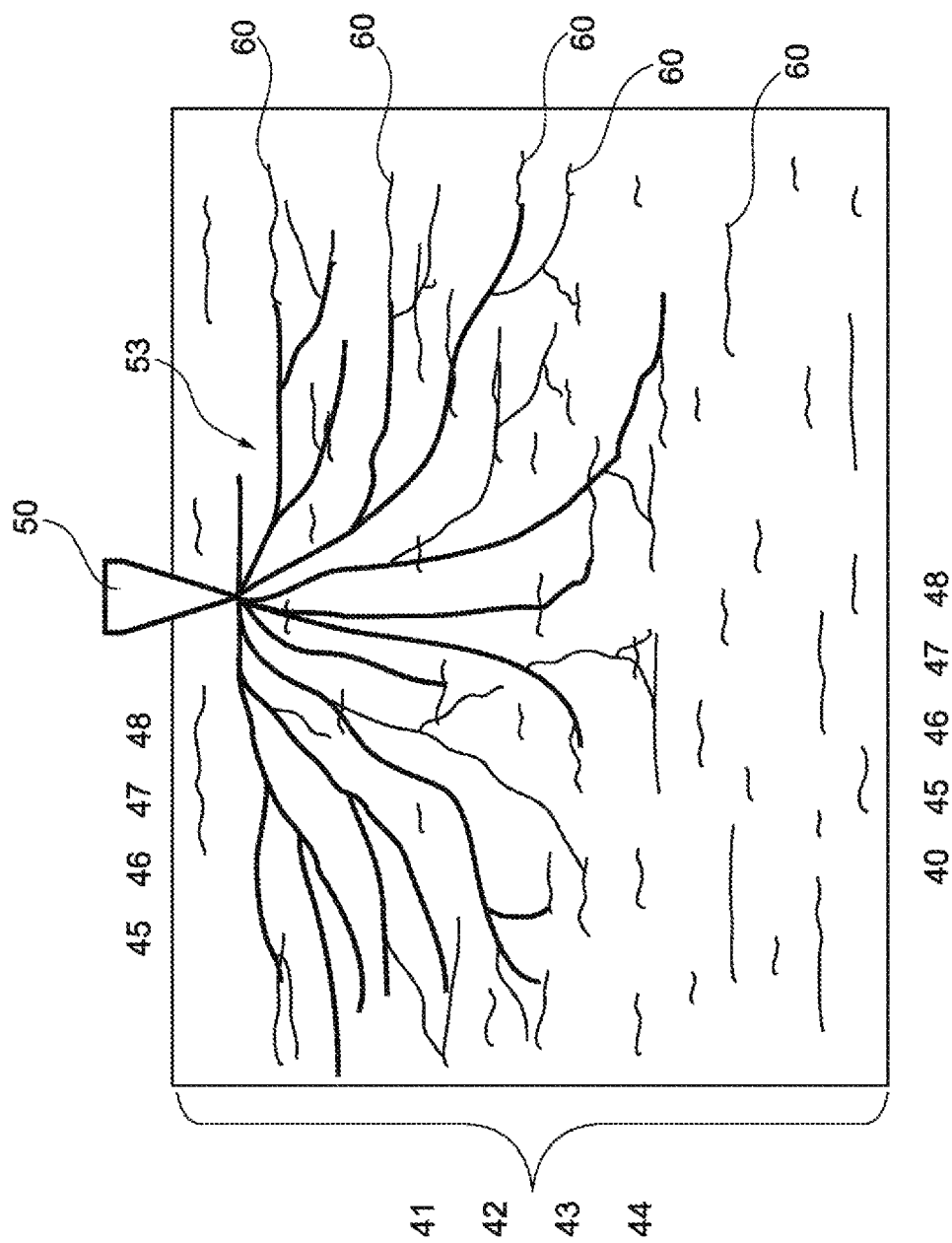
FIG. 5 a depiction of the intermediate layer according to the invention having microcracks parallel to the surface or to the substrate material.

FIG. 5 schematically shows an embodiment of the intermediate layer 41, 42, 43, 44 according to the invention having microcracks parallel to the surface or to the substrate material. Microcracks 60 have the same effects as pores 59. However, they have to be oriented parallel to the surface of the substrate material in order to stop cracks which go out from the ceramic main layer 45, 46, 47, 48 of the multilayer system 39.

FIG. 6 shows an intermediate layer 41, 42, 43, 44 having deliberately introduced foreign phases 61. These foreign phases 61 result in cracks which go out from the ceramic main layer 45, 46, 47, 48 of the multilayer system 39 changing the direction of propagation, branching and not growing through to the substrate material 40. Here, the cracks are deflected either at the weak interface to the foreign phase 62 or by preferential propagation into the foreign phase.

It should be stated that the embodiments in FIG. 4, in FIG. 5 and in FIG. 6 can be combined with one another. Thus, an intermediate layer 41, 42, 43, 44 can comprise pores, microcracks parallel to the surface or to the substrate material and/or foreign phases.

What is claimed is:

1. A component having a coating thereon, wherein the coating is an anti-wear coating and comprises at least two different individual layers which alternate, the at least two individual layers comprising a ceramic main layer A and a non-metallic intermediate layer B configured in such a way that energy is withdrawn from cracks which grow in a direction of the component by crack branching in layer B so that crack growth is slowed or stopped, one of the layers B being arranged directly on the component and one of the layers A being arranged at a surface of the coating, and wherein layer B at least one of comprises a material having preferential sliding planes which are arranged parallel to a surface of the component;

is a multilayer system which comprises ceramic layers as well as layers comprising a material having preferential sliding planes which are arranged parallel to a surface of the component;

comprises a ceramic material having pores deliberately introduced therein;

comprises a ceramic material comprising deliberately introduced microcracks running parallel to a surface of the substrate;

comprises a ceramic material comprising a deliberately introduced foreign phase.

2. The component of claim 1, wherein layer B comprises a material having preferential sliding planes which are arranged parallel to a surface of the component.

3. The component of claim 2, wherein the material having preferential sliding planes has a sheet structure or a hexagonal lattice structure.

4. The component of claim 3, wherein the preferential sliding planes are sheet planes or basal planes.

5. The component of claim 3, wherein the material having a sheet structure or a hexagonal lattice structure comprises at least one of arsenic and antimony.

6. The component of claim 3, wherein the material having a sheet structure or a hexagonal lattice structure comprises at least one of graphite and hexagonal boron nitride.

7. The component of claim 1, wherein layer B is a multilayer system which comprises ceramic layers as well as layers comprising a material having preferential sliding planes which are arranged parallel to a surface of the component.

8. The component of claim 7, wherein the material having preferential sliding planes has a sheet structure or a hexagonal lattice structure.

9. The component of claim 7, wherein the material having a sheet structure or a hexagonal lattice structure comprises at least one of arsenic and antimony.

10. The component of claim 7, wherein the material having a sheet structure or a hexagonal lattice structure comprises at least one of graphite and hexagonal boron nitride.

11. The component of claim 7, wherein layer B comprises at least one of C/TiC, C/SiC, C/ZrC, hexagonal BN/cubic BN, hexagonal BN/SiC.

12. The component of claim 1, wherein layer B comprises a ceramic material having pores deliberately introduced therein.

13. The component of claim 12, wherein the ceramic material comprises at least one of chromium nitride, titanium nitride, chromium aluminum nitride, titanium aluminum nitride, chromium silicon nitride, titanium silicon nitride.

14. The component of claim 1, wherein layer B comprises a ceramic material comprising deliberately introduced microcracks running parallel to a surface of the substrate.

15. The component of claim 14, wherein the ceramic material comprises at least one of chromium nitride, titanium nitride, chromium aluminum nitride, titanium aluminum nitride, chromium silicon nitride, titanium silicon nitride.

16. The component of claim 1, wherein layer B comprises a ceramic material comprising a deliberately introduced foreign phase.

17. The component of claim 1, wherein the component is subject to erosion under mechanical stress.

18. The component of claim 17, wherein the component is a gas turbine component.

19. A method of slowing or stopping microcrack formation in a component which is subject to erosion under mechanical stress, wherein the method comprises applying to a surface of the component an anti-wear coating comprising at least two different individual layers which alternate, the at least two individual layers comprising a ceramic main layer A and a non-metallic intermediate layer B configured in such a way that energy is withdrawn from cracks which grow in a direction of the component by crack branching in layer B so that crack growth is slowed or stopped, one of the layers B being arranged directly on the component and one of the layers A being arranged at a surface of the coating, and wherein layer B at least one of comprises a material having preferential sliding planes which are arranged parallel to a surface of the component;

is a multilayer system which comprises ceramic layers as well as layers comprising a material having preferential sliding planes which are arranged parallel to a surface of the component;

comprises a ceramic material having pores deliberately introduced therein;

comprises a ceramic material comprising deliberately introduced microcracks running parallel to a surface of the substrate;

comprises a ceramic material comprising a deliberately introduced foreign phase.

20. The method of claim 19, wherein the component is a gas turbine component.

* * * * *